United States Patent [19]
Wu

[11] Patent Number: 5,342,113
[45] Date of Patent: Aug. 30, 1994

[54] MULTI-PURPOSE BABY ROCKING CHAIR

[76] Inventor: Chung-Tien Wu, 3rd Fl., No. 6, Lane 51, Hua-Mei St., Taichung City, Taiwan

[21] Appl. No.: 176,939

[22] Filed: Jan. 4, 1994

[51] Int. Cl.⁵ .................................. A47C 3/02
[52] U.S. Cl. .................................. 297/260; 297/183; 297/184.17; 297/217; 5/109
[58] Field of Search ............... 297/260, 258, 264, 268, 297/130, 344.15, 344.17, 344.2, 183, 184.11, 184.13, 184.17, 217, DIG. 7, DIG. 4, DIG. 11; 5/108, 109

[56] References Cited
U.S. PATENT DOCUMENTS

| | | | |
|---|---|---|---|
| 3,529,311 | 9/1970 | Crawford | 5/109 |
| 4,787,593 | 11/1988 | Pipon et al. | 297/344.15 X |
| 4,911,499 | 3/1990 | Meeker | 297/260 |
| 5,149,113 | 9/1992 | Alldredge | 297/130 X |

FOREIGN PATENT DOCUMENTS 2594310  8/1987  France .................. 297/260

Primary Examiner—Laurie K. Cranmer
Attorney, Agent, or Firm—W. Wayne Liauh

[57] ABSTRACT

Disclosed is a multi-purpose baby rocking chair which has a rocking mechanism powered by a DC motor. The rocking mechanism includes a rotary arm which is driven by the motor to turn upward and downward, causing the seat of the baby rocking chair connected to the rocking mechanism to swing up and down in a vertically reciprocating movement. The baby rocking chair can also be conveniently converted into a handcart.

5 Claims, 4 Drawing Sheets

MULTI-PURPOSE BABY ROCKING CHAIR

BACKGROUND OF THE INVENTION

A conventional baby rocking chair available on the market is generally manually operated, it requires and consumes excessive time of continuous swing to and fro while it is inconvenient in use. There are newly developed baby chairs adopting advanced designs, for example, an electromagnetic inductance baby rocking chair which is, however, restricted by the apparatus itself and the weight of the baby carried and can only swing in lateral directions. In addition, such a baby rocking chair has limited function and can not be used in a movable manner.

SUMMARY OF THE INVENTION

The present invention relates to a multi-purpose baby rocking chair mainly consisting of a base, a seat, and a rocking mechanism, being characterized by that the rocking mechanism is disposed at a rear side of the base and connected at its upper end to a rear bottom side of the seat so that when the rotating torque provided by a DC motor thereof is converted by gears thereof into a traction for vertically reciprocating movement, the seat connected to the rocking mechanism is swung up and down, and that the base is a substantially rectangular body having wheels at its bottom and side positioning bars for engaging with positioning holes on two sides of the seat so that the baby rocking chair can be used as a handcart, too.

The advantages of the baby rocking chair according to the present invention are:

1. The DC motor used in the present invention has a working voltage about 6 V or 7 V, and therefore, a baby in the chair is safe without suffering from the danger of getting an electric shock. In addition, the power is supplied by chargeable battery and therefore, the baby rocking chair is not limited to indoor use.

2. The rocking mechanism used in the present invention may be adjusted in length depending on the load on the seat. That is, the length of the rocking mechanism can be adjusted depending on the age of baby using the rocking chair and the habitual movement of the adult handling the same. The baby rocking chair of the present invention has therefore, longer usable life and wider applications.

3. The present invention can be used as a handcart to provide good mobility. This two-in-one design fully meets the requirements of being convenient and economical in modern family life.

DETAILED DESCRIPTION OF THE PREFERRED EMBODIMENTS

Figure 1:
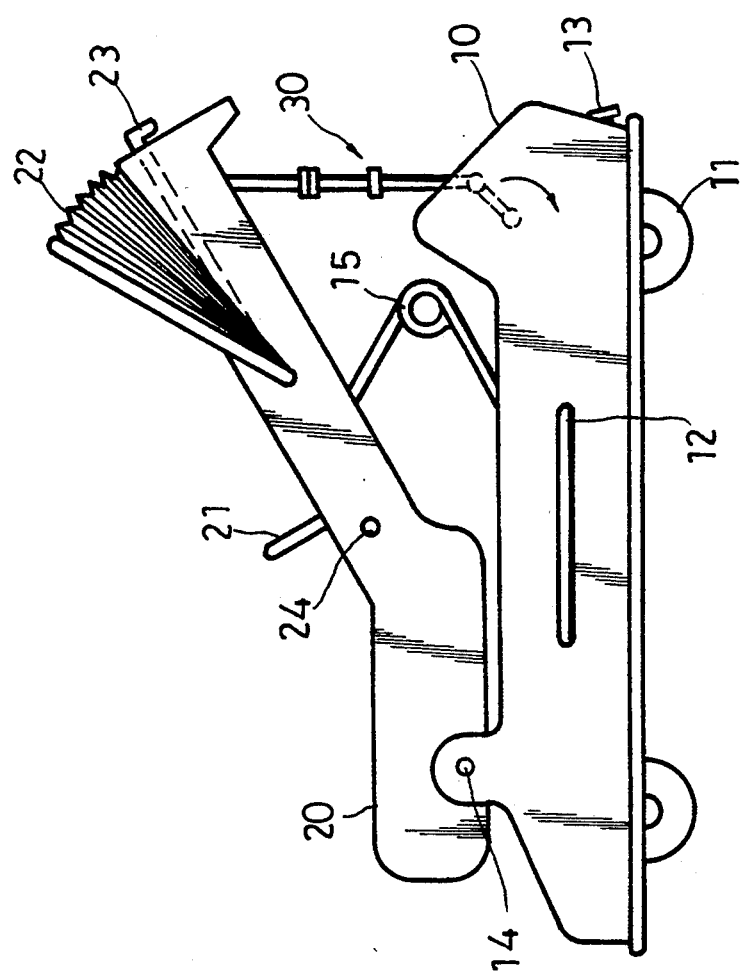
FIG. 1 is a schematic drawing showing an embodiment of the multi-purpose baby rocking chair of the present invention.

Please first refer to FIG. 1. The multi-purpose baby rocking chair according to the present invention mainly consists of a base 10, a seat 20 pivotally connected to the top of the base 10, and a rocking mechanism 30 disposed at a rear side of the baby rocking chair between the base 10 and the seat 20. The base 10 is a substantially rectangular body having wheels 11 provided at its bottom side, a positioning bar 12 pivotally fixed to each side thereof, and a brake assembly 13 mounted at a rear end thereof for locking the baby rocking chair from sliding when it is used as a rocking chair and in an operating state. A pivot 14 is provided near an upper front of the base 10 for pivotally connecting the same to a lower front of the seat 20. And a spring 15 is disposed between the base 10 and the seat 20 to support the load on the seat 20.

Figure 2:
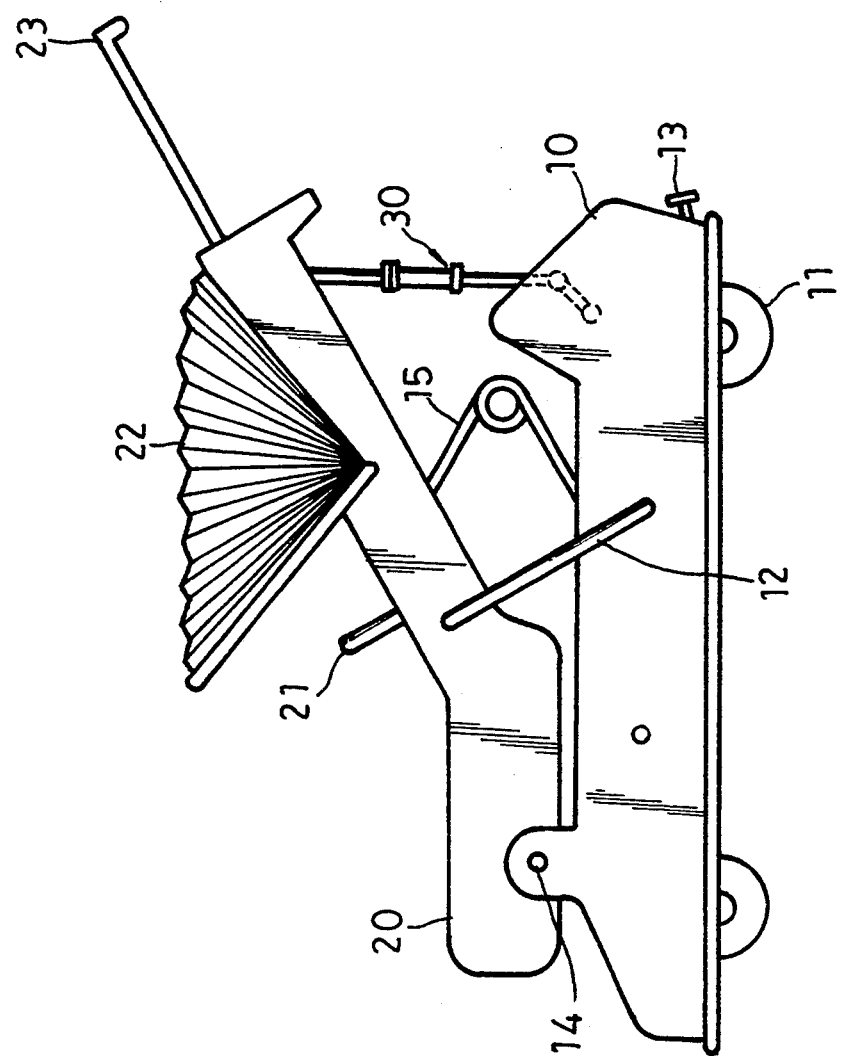
FIG. 2 is a schematic drawing showing the multi-purpose baby rocking chair being used as a handcart.

The seat 20 has a substantially horizontal portion and an inclined back portion extending upward and outward. A protective handle 21 is fixed to and transversely extends across the lower front of the back portion of the seat 20, a collapsible accordion-like sunshade 22 is provided at an upper part of the back portion, and a retractable push bar 23 is provided for use as necessary. A positioning hole 24 is formed at each side of the seat 20 at a predetermined position for securely receive one free end of the positioning bar 12 at each side of the base 10 when the baby rocking chair is to be used as a handcart. As shown in FIG. 2, when the baby rocking chair of the present invention is to be used as a handcart, first engage the positioning bars 12 with the positioning holes 24, then pull out the push bar 23, and then unlock the brake assembly 13. At this point, a handcart can be formed for normal use.

The rocking function of the present invention is provided by the rocking mechanism 30 which converts the rotating torque produced by a motor into a traction for vertically reciprocating movement, causing the seat 20 of the baby rocking chair connected with the rocking mechanism to swing up and down.

Figure 3:
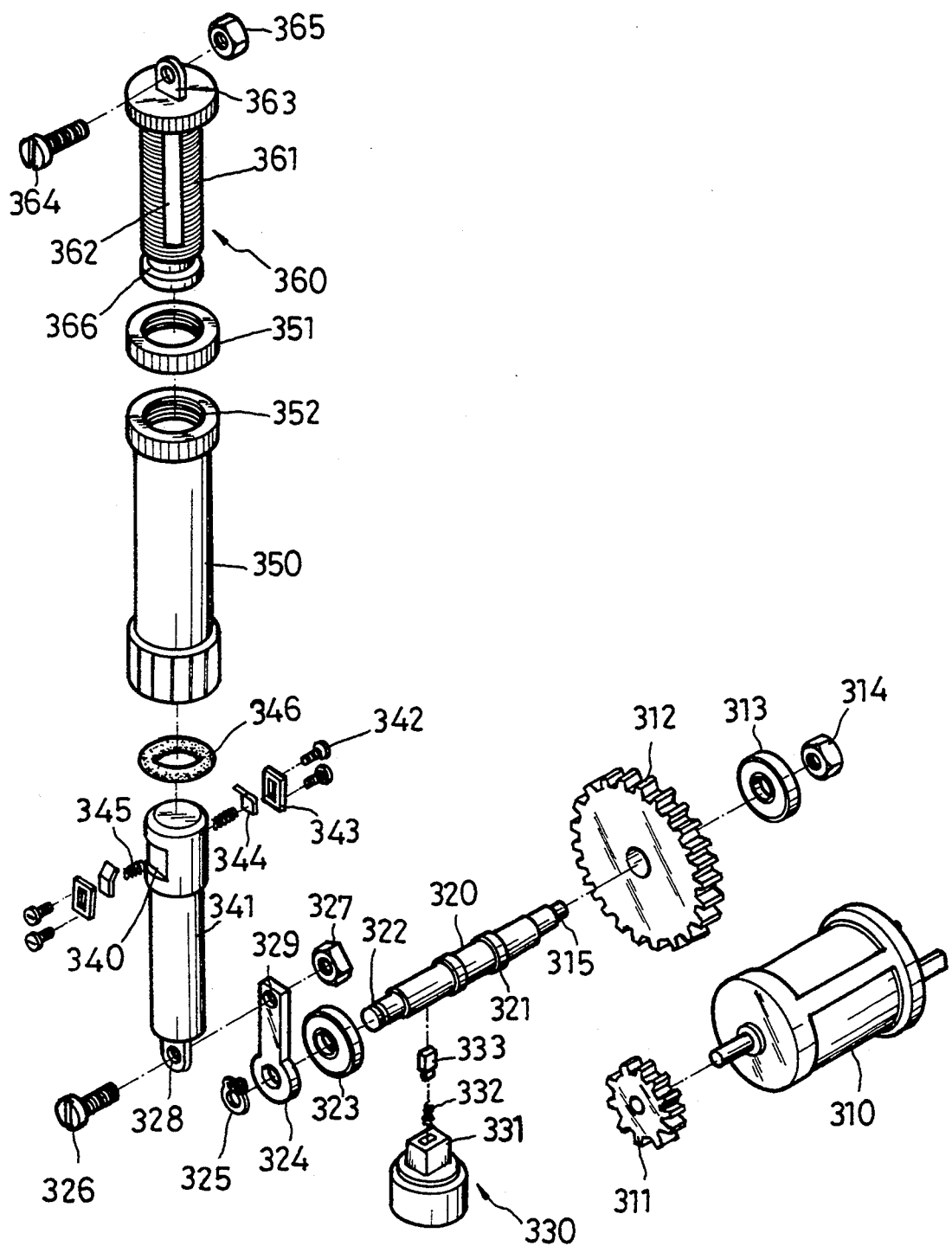
FIG. 3 is an exploded perspective of the rocking mechanism used in the present invention.

Please refer to FIG. 3 now. The rocking mechanism 30 of the present invention includes a DC motor 310 which produces rotating torque, which, through a small gear 311 coupled with the motor 310, turns a driving gear 312 having more teeth and larger diameter than that of the small gear 311, so that a reduced rotatory speed and a larger arm of force can be achieved. The driving gear 312 is fixed on a driving shaft 320 by means of a bearing 313 and a nut 314 screwed to external threads 315 formed at a first end of the driving shaft 320. The driving shaft 320 has two collars 321 formed near a central portion thereof and an annular groove 322 formed at a second end thereof. A rotary arm 324 is connected at its first end to the driving shaft 320 and is received in the annular groove 322 by means of a retaining ring 325 and a bearing 323. Furthermore, a shock absorber 330 is provided below the driving shaft 320, in which an insert 333 and a spring 332 are received in a square recess 331 of the shock absorber 330 so as to absorb the vibration and accordingly reduce the noise produced by the driving shaft 320 during its rotation.

The rock arm 324 has a second end with a threaded hole 329 formed thereat and is connected to a long coupling 341 at a lower end thereof by means of a screw 326 put through the threaded hole 329 of the rotary arm 324 and a threaded hole 328 formed at the lower end of the coupling 341 and engaged with a nut 327. The coupling 341 is a conventional quick coupling and has two opposite retaining recesses 340 formed near its upper end. By using screws 342 to fasten washers 343, press plates 344, and springs 345 sequentially disposed from out-side to inside to the recesses 340, the coupling 341 is tightly attached to a cylindrical rotating sleeve 350 at a lower end thereof. The rotating sleeve 350 has an upper end with internal threads 352 which can engage with external threads 362 of a threaded core member 360 with the aid of a positioning nut 351. The threaded core member 360 has an annular groove 366 formed at its lower end to receive a fixing ring 346 therein to prevent the rotating sleeve 350 from disengaging from the threaded core member 360. The threaded core member 360 further has a vertically extended recess 362 formed at one side of its outer surface. On the surface of the recess 362, scales are provided for indicating to what extent the threaded core member 360 has been screwed into the rotating sleeve 350. The top of the threaded core member 360 has a threaded hole 363 which together with a screw 364 and a nut 365 allows the whole rocking mechanism 30 to be fixed to the bottom side of the seat 20.

Figure 4:
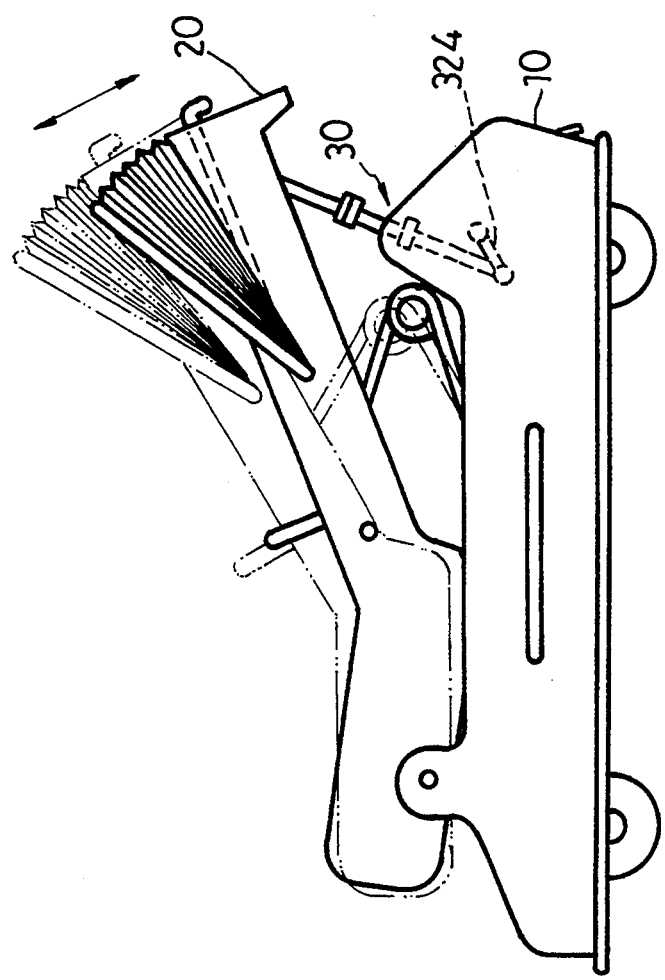
FIG. 4 is a schematic drawing showing the operation of the present invention when being used as a baby rocking chair.

Please refer to FIG. 4. When the rotary arm 324 turns downward, the seat 20 is pulled to swing downward, and when the rotary arm 324 turns upward, it together with the recovery force of the spring 15 push the seat 20 to swing upward. With repeated traction applied to the seat 20 by the rocking mechanism 30, the seat 20 keeps swinging up and down as an automatic baby rocking chair.

Since the inclination of the back portion of the seat 20 becomes smaller with the increase of the baby's weight, and for the purpose to achieve better rocking effect of the chair under this condition, the vertical recess 362 with scales on the threaded core member 360 may be utilized to adjust the extent to which the threaded core member 360 is screwed into the rotating sleeve 350. When a heavier baby is seated in the baby rocking chair, the threaded core member 360 may be screwed into the rotating sleeve 350 deeper to shorten the total length of the rocking mechanism 30; reversely, when the baby using the baby rocking chair is less heavy, the total length of the rocking mechanism 30 can be adjusted to be longer.

What is claimed is:

1. A multi-purpose baby rocking chair, comprising:

a base which is a substantially rectangular-shaped body equipped with wheels at a bottom thereof and has a positioning bar pivotally fixed at each side thereof, a brake assembly disposed at a rear end thereof to selectively lock said baby rocking chair when the same is used as a rocking chair and in a rocking state or unlock said baby rocking chair when the same is used as a handcart, a pivot assembly provided near an upper front thereof, and a spring connected to a top portion thereof;

a seat having a horizontal portion pivotally connected to said pivot assembly on said base and an inclined back portion extending upward and outward from the horizontal portion, said back portion being provided with a retractable push bar which is normally concealed inside said back portion when it is not in use, and a positioning hole at each side thereof for receiving one free end of said positioning bars at two sides of said base body; and a rocking mechanism in which a DC motor powered by a chargeable battery is used to produce rotating torque so as to turn a driving gear connected to one end of a driving shaft, said driving shaft connecting at another end thereof a rotary arm, and said rotary arm being connected at its another end to a lower end of a coupling, an upper end of said coupling being fitted into a lower end of a rotating sleeve, said rotating sleeve having an upper end provided with internal threads for an externally threaded core member to screw thereinto, and said core member having a threaded hole provided at a top portion thereof so that said entire rocking mechanism is fixedly screwed to the bottom side of said seat by means of screw and nut engaging with said top threaded hole of said rocking mechanism; and said rotary arm being repeatedly pulled by said motor through said driving gear and said driving shaft to turn upward or downward and thereby causing said seat connected with said rocking mechanism to swing in vertically reciprocating movement;

said baby rocking chair being characterized by that said brake assembly provided at the rear end of said base can be selectively unlocked and said positioning bars at two sides of said base can be pivotally shifted upward so that the free end thereof can be engaged with said positioning holes on two sides of said seat, and said concealed and retractable push bar of said seat can be pulled outward so that said baby rocking chair functions like a handcart.

2. A multi-purpose baby rocking chair as claimed in claim 1, wherein said seat is provided with a protective handle fixed to and transversely crossing over a middle portion of said seat.

3. A multi-purpose baby rocking chair as claimed in claim 1, wherein said seat is provided with a collapsible sunshade at a rear portion thereof.

4. A multi-purpose baby rocking chair as claimed in claim 1, wherein said rocking mechanism has a scale provided in a vertical recess formed on a side surface of said threaded core member for easily finding out the total length of said rocking mechanism.

5. A multi-purpose baby rocking chair as claimed in claim 1, wherein said rocking mechanism is provided with a shock absorber to reduce the vibration and noise produced by said rocking mechanism when it operates.

* * * * *